July 27, 1965 R. A. LEIGHTNER ETAL 3,197,736

PATTERN RECOGNITION SYSTEM

Filed May 22, 1962 2 Sheets-Sheet 1

INVENTOR
ROBERT A. LEIGHTNER
EUGENE N. SCHROEDER
BY Bernard N. Wiener
ATTORNEY

United States Patent Office 3,197,736
Patented July 27, 1965

3,197,736
PATTERN RECOGNITION SYSTEM

Robert A. Leightner, Tioga Center, N.Y., and Eugene N. Schroeder, Bethesda, Md., assignors to International Business Machines Corporation, New York, N.Y., a corporation of New York Filed May 22, 1962, Ser. No. 196,628
7 Claims. (Cl. 340—146.3)

This invention relates generally to pattern recognition systems and it relates more particuarly to a pattern recognition system for recognizing a pattern by contrasting parameters which delineate it in a field of view.

A pattern is a geometrical representation of data or pictorial information which is recognized by a pattern recognition system through particular physical characteristics thereof. The pattern recognition system recognizes the pattern in a field of view in terms of standard reference information. The field of view is a region of space which is scanned by the pattern recognition system.

A pattern recognition system senses the spatial distribution of a physical characteristic which is being utilized to define the pattern, it decodes the sensed distribution by comparing information derived thereform in terms of standard reference information, and it provides an indication of the particular pattern recognized.

It is important that a pattern recognition system be responsive to a wide registration of the field of view on a sensor. The registration of a field of view on the sensor indicates its relative orientation thereon. It is also important that a pattern recognition system be responsive to a wide variation in the pattern intensity over the field of view. It is desirable that a pattern recognition system be easily constructed, provide accurate pattern recognitions, operate reliably and have relatively low cost.

An alpha-numeric pattern is a pattern which represents a letter of an alphabet or a numeral of a number system. Heretofore, pattern recognition systems for alphanumeric patterns have not been responsive to a wide range of gradation between adjacent light and dark areas which delineate the pattern in the field of view. Further, the orientation of the field of view on the sensor had to be established within narrow limits relative to a standard orientation.

It is the primary object of this invention to provide a pattern recognition system.

It is a second object of this invention to provide a pattern recognition system which is responsive to a wide gradation of the energy distribution in the field of view on the sensor.

It is a third object of this invention to provide a pattern recognition system which is responsive to a wide gradation of energy intensity between adjacent light and dark areas in a field of view on the sensor.

It is a fourth object of this invention to provide a pattern recognition system in which the orientation of the field of view on the sensor may be established within wide limits.

It is a fifth object of this invention to provide a pattern recognition system in which gradations of the energy intensity in the field of view are correlated to provide recognition of the pattern delineated thereby.

It is a sixth object of this invention to provide a pattern recognition system in which the field of view is scanned by a sensor section to obtain information concerning the light and dark areas thereof; and in which the information is decoded by a decoder section, whereby an indication of the particular pattern in the field of view is obtained.

It is a seventh object of this invention to provide a pattern recognition system having a sensor section with a matrix of photo-sensitive diodes receptive of a focused image of the field of view; and having a pair of decoder matrices for comparing the light and dark areas thereof with reference standard information, whereby an indication of the pattern in the field of view is obtained.

It is an eighth object of this invention to provide a pattern recognition system with a respective pair of decoder matrices for each pattern to be recognized.

It is a ninth object of this invention to provide a pattern recognition system in which the sensor matrix and the decoder matrices are each established from a respective homogeneous slab of material.

The foregoing and other objects, features and advantages of the invention will be apparent from the following more particular description of a preferred embodiment of the invention, as illustrated in the accompanying drawings.

Figure 1:
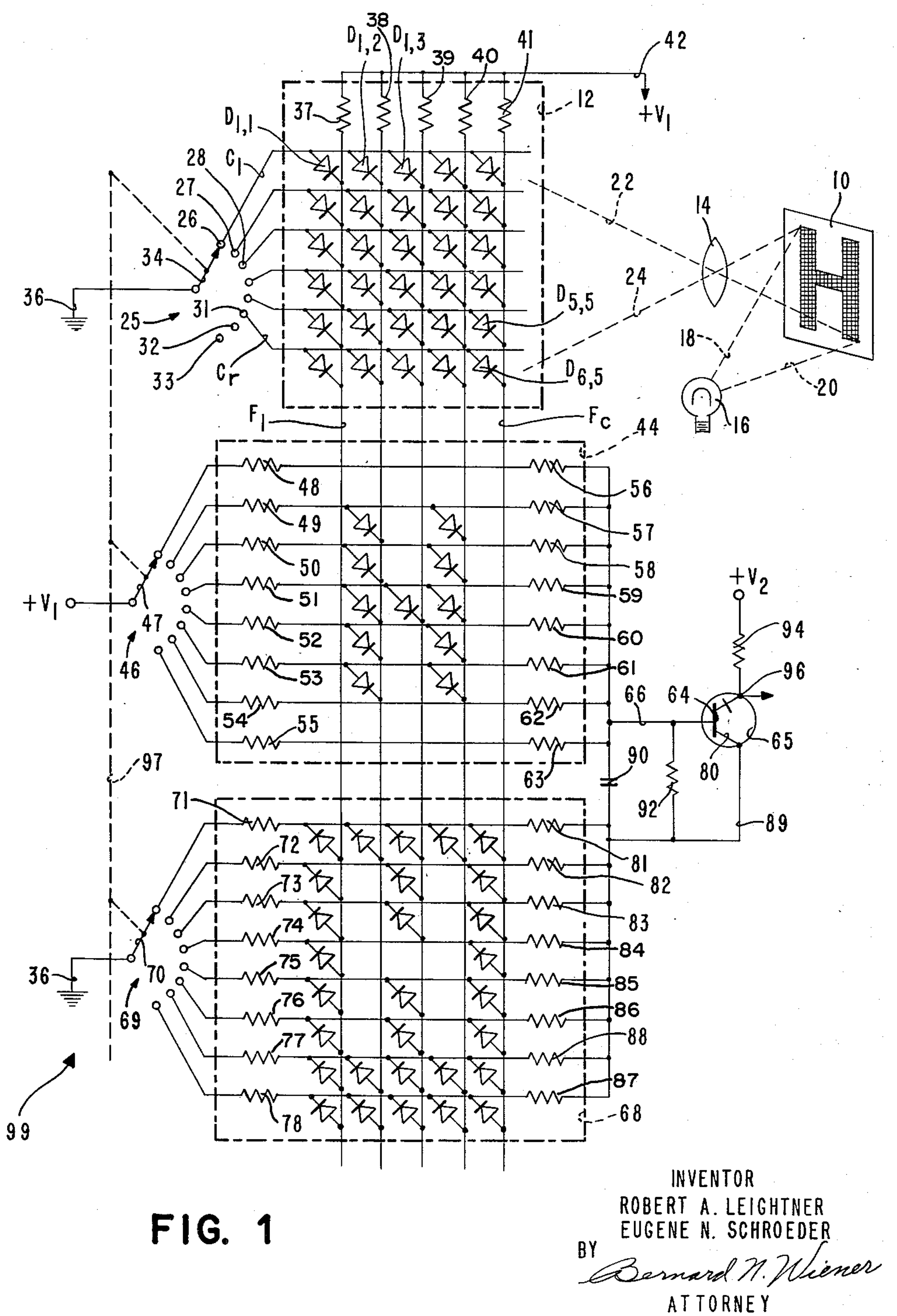
FIGURE 1 is a schematic diagram showing a sensor photo-diode matrix and a pair of decoder diode matrices whereby an indication of the pattern to be recognized is obtained by a scanning technique.

Broadly, this invention provides a pattern recognition system which incorporates a sensor section and decoder section. A pattern, which is delineated by the contrasting gradations of light and dark areas of a physical characteristic in a field of view, is scanned and focused on the sensor section. A decoder section having a pair of decoder portions for each characteristic pattern to be recognized is connected to the sensor section. Each respective decoder portion manifests a reference standard information which is compared with a particular characteristic pattern delineated by the light and dark areas in the field of view. A switching section compares portions of the sensor section with each of the decoder portions in a field sequential manner. An indicator section connected to the decoder section provides an indication of a characteristic pattern in the field of view.

More particularly, the sensor section consists of a photo-sensitive diode matrix upon which is focused an image of the field of view being scanned. Each decoder section includes a light area diode matrix decoder portion and a dark area diode matrix decoder portion. Each decoder portion has an array of diodes whose geometrical configuration resperents the respective light or dark area in the field of view. The interconnections between the sensor matrix and the decoder matrices and the switching arrangements therefor are such that respective rows are sequentially compared in a field sequential manner. The scanning movement of the field of view on the sensor is relatively slow compared to the switching comparison. The field sequential comparison of the sensor matrix with the decoder matrices indicates that the sensor matrix is electrically superimposed thereon in a sequential and overlapping manner.

In greater detail, the invention incorporates a scan and offset generator, a sensor diode matrix slab, and a decoder having a decoding slab matrix pair for each pattern to be recognized. The scan and offset generator consists of a stepping switch for energizing the horizontal lines of the sensor and decoder diode slabs sequentially. By offsetting the comparison one line for each scan, the entire vertical dimension of the sensor section is surveyed.

The sensor diode slab is a silicon slab of photo-diodes fabricated by cutting slots in a silicon photo-cell in a grid pattern and covering the top surface thereof with light transparent conductive strips. The sensor matrix consists of two sets of parallel conductors which are perpendicular respectively and establish a photo-sensitive diode at every cross point.

The decoding slab pairs of the decoder consist of two diode slabs each of which is similar to the slabs used as a sensor. One slab is used to detect the light area in the field of view and the other slab is used to detect the dark area in the field of view. In correspondence with the pattern in the field of view that the pair of decoding slabs is to detect in the dark area detecting slab, diodes are removed from the relative light area of the field of view, and in the light area detecting slab, diodes are removed from the relative dark area of the field of view. Where diodes are removed from the same area on both decoding slabs of the decoder slab pair, the information coupled to that area from the sensor has no effect on the output. A tolerance is thereby readily built into the decoding slabs by spacing the diodes in accordance with the variations in the dimensions of the pattern to be recognized.

An indicator network including an integrating resistor capacitor circuit is utilized to obtain the time integral of the outputs from the light area and dark area decoding slab matrices.

The nature of a preferred embodiment of this invention will be described with reference to FIG. 1 which illustrates a photo-diode matrix and a pair of decoder matrices for the letter H in a field of view. A document 10 with the letter H thereon is established in optical communication with sensor 12 by projection lens 14. Light rays 18 and 20 from light source 16 illuminate document 10. Reflected light rays 22 and 24 from document 10 are projected on sensor diode matrix 12 by lens 14. The light rays 22 and 24 activate the photo-sensitive diodes of sensor diode slab 12. Photo-sensitive diodes $D_{1,1}$ to $D_{6,5}=D_{r,c}$ comprise a diode matrix whose rows are elecally connected by horizontal conductors $C_1$ to $C_r$ and whose columns are connected by vertical conductors $F_1$ to $F_c$. Conductors $C_1$ to $C_r$ are connected to contacts 26 to 31, respectively, of stepping switch 25. Contacts 32 and 33 of stepping switch 25 are not connected to sensor matrix 12 in order to provide an electrical registration offset for each scan of the wiper arm 34. The stepping switch 25 wiper arm 34 is connected to ground 36. Each vertical conductor $F_1$ to $F_c$ is connected via resistors 37 to 41, respectively, to positive voltage source $+V_1$ via conductor 42.

Dark area decoder matrix 44 is connected to sensor matrix 12 via vertical conductors $F_1$ to $F_c$. The vertical conductors $F_1$ to $F_c$ are connected to diode matrix array 44 in a pre-established form of the dark area of the letter H. The horizontal conductors of decoder matrix 44 are connected via resistors 48 to 55, respectively, to the contacts of stepping switch 46 and via resistors 56 to 63, respectively, to input base 64 of four-layer transistor 65 via conductor 66. Wiper arm 47 of stepping switch 46 is connected to positive voltage source $+V_1$. Light area decoder matrix 68 is connected to dark area matrix 44 via vertical conductors $F_1$ to $F_c$. Light area decoder matrix 68 is connected to the contacts of stepping switch 69 via resistors 71 to 78, respectively, and to emitter 80 of four-layer transistor 65 via commonly connected resistors 81 to 88, respectively, in series with conductor 89. Wiper arm 70 of stepping switch 69 is connected to ground 36. The circuitry of the four-layer transistor 65 includes capacitor 90 and resistor 92 connected in parallel between base 64 and emitter 80. Positive voltage source $+V_2$ is connected via resistor 94 to terminal 96 of transistor 65. Wiper arms 34, 47 and 70 of stepping switches 25, 46 and 69, respectively, are mechanically connected by shaft 97 to provide simultaneous operation.

Figure 2:
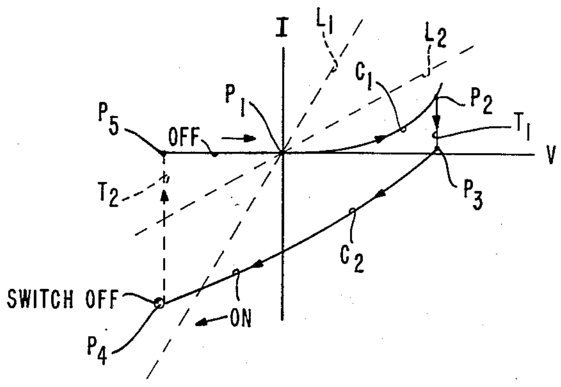
FIGURE 2 is the current vs. voltage characteristic of a typical four-layer transistor suitable for practice of this invention.

FIG. 2 shows the current I versus voltage V characteristic of the base 64 to emitter 80 junction when the four-layer transistor 65 is switched on and off by an input pulse. Assuming that four-layer transistor 65 is initially in its "OFF" state at curve point $P_1$, the base current is zero. As the base voltage is increased, the base current follows curve $C_1$ until curve point $P_2$ is reached. The input current is sufficient at curve point $P_2$ to turn the four layer transistor 65 to its "ON" state, and the base 64 current passes on transition curve $T_1$ to curve point $P_3$. Transition curve $T_1$ results from the four-layer transistor 65 supplying part of its own input current through redistribution of its internal minority carriers. As the base 64 voltage is reduced, the base current follows curve $C_2$ until point $P_4$ is reached. At curve point $P_4$ the input current has changed direction and is large enough to overcome the input current supplied by four-layer transistor 65. Since the base to emitter junction is back-biased, no base current flows and the base arrives at curve point $P_5$ via transition curve $T_2$. If the base voltage is now increased, the base 64 follows curve $C_1$ to curve point $P_1$. If the base impedance is chosen to give a load line $L_1$, the four-layer transistor 65 has two stable states. If the base impedance is lowered to provide a load line $L_2$ as in the practice of this invention, the four-layer transistor as "OFF" as the only stable state. The specific slope of a four-layer transistor load line is determined by the particular four-layer transistor and its associated circuit parameters.

In operation of the pattern recognition system hereof, the document 10 whose pattern information H is to be identified, is coupled to the sensor 12 optically. Its image moves slowly past the sensor slab 12 which converts the optical information to a positive or ground voltage on the respective parallel vertical conductors $F_1$ to $F_c$ along the horizontal line that the scanning switch 99 is energizing. The electrical output from the decoder slab pair matrices 44 and 68, whose diode patterns match the light and dark areas on the field of view of the document 10, charges the capacitor 90 to a particular electrical voltage level and the four-layer transistor 65 conducts thereby giving an output signal on terminal 96 indicative of the letter H in the field of view. The outputs from decoder diode matrices 44 and 68 are effectively integrated through the R-C network of capacitor 90 and resistors 56 to 63 of decoder matrix 44 and resistors 81 to 88 of decoder matrix 69. The electrical voltage level at which the four-layer transistor 65 goes into conduction establishes a tolerance for smearing of the pattern on the document 10.

Vertical scanning of the field of view on sensor matrix 12 is achieved by offsetting the top switch 25 of the ganged scanning switch 99 one position each revolution in a conventional manner, as by gearing. Switch arm 34 is advanced or retarded one contact position each subsequent revolution as compared with switch arms 47 and 70.

A typical construction of a diode slab 200 will be described with reference to FIG. 3. An N-type silicon semiconductor slab 201, shown partially in section, with a diffused P-type surface layer 203 is cut, as by etching, to form a rectangular matrix array of diodes, e.g., diodes 204 and 205. Diodes 204 and 205 are constructed from semiconductor slab 201 by the intersection of parallel cuts 207, 208 and 209 and parallel cuts 210 and 211 perpendicular thereto. The cuts are filled with a low melting temperature glass 212 to afford mechanical rigidity. Fused carbon resistors 214 are formed on the edges of the semiconductor slab 201 and are interconnected with the conductors $C_1$ to $C_9$ and with conductor layer 215. Conductors $C_1$ to $C_9$ are thin metallic translucent films which are vacuum deposited on the semiconductor slab 201 to complete the diode matrix wiring. The semiconductor diode slab 201 of FIG. 3 is cut on the bottom surface to construct parallel drive lines $F_1$ to $F_7$.

Figure 3:
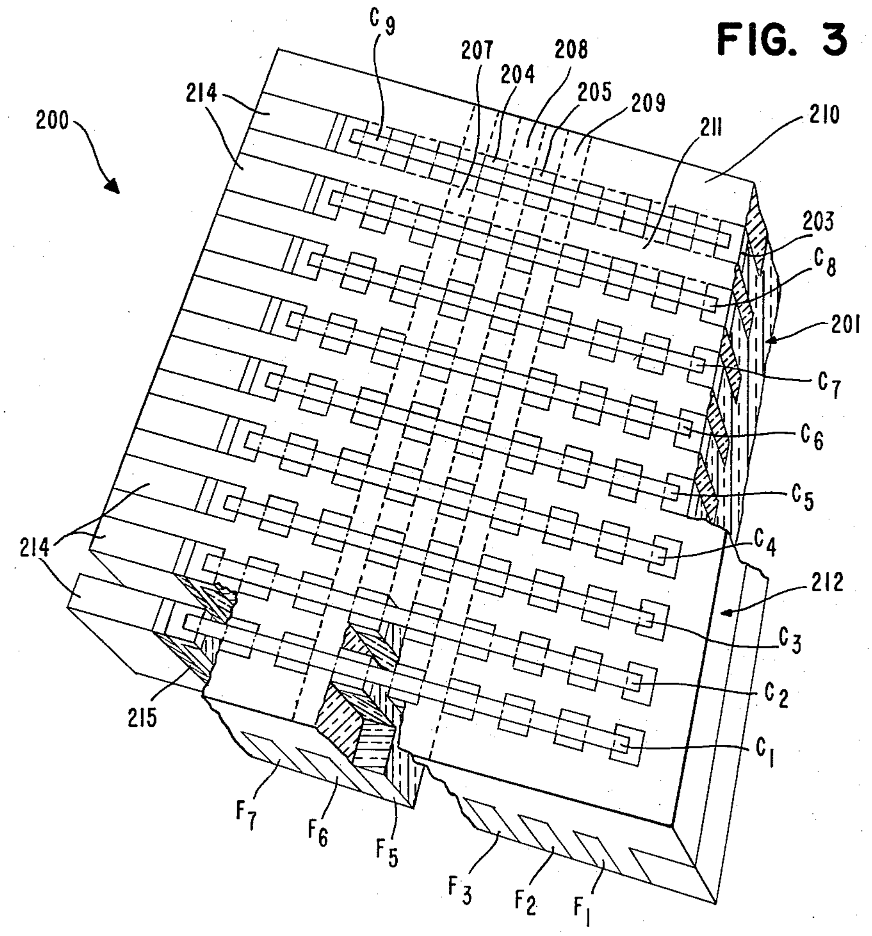
FIGURE 3 is a perspective view of a photo-diode matrix slab suitable for the practice of this invention illustrating the technique of its construction.

With reference to FIGS. 1 and 3, light area decoding matrix 68 has diodes removed in accordance with the appearance of the pattern H to be detected; and dark area decoding matrix 44 has diodes present in an array with the appearance of the pattern H to be detected. These diodes are constructed by photo-etching and the voids formed thereby are filled with low melting temperature glass.

An advantage of the pattern recognition system hereof is that the decoder slab pairs may be easily replaced for documents utilizing different types. The slab pairs are easily constructed by photo-etching. A tolerance is built into each slab pair by selectively omitting diodes from each slab of a decoder slab pair. For increased sensitivity, many identical decoder slab pairs are easily connected in parallel.

*Summary*

This invention provides a pattern recognition system that is easily programmed for various characters, is readily implemented in a small package for incorporation into data processing machines, and is easily and economically manufactured. In the practice of this invention, an optical pattern is imparted to a sensor photoelectric diode matrix. A pair of decoder diode matrices is electrically connected to the sensor matrix. The decoder diode matrices respond selectively to the light and dark areas of the sensed pattern and provide a respective electrical signal. The electrical signals are integrated and an output signal is derived therefrom which indicates the particular pattern recognized.

The light and dark areas of the field of view are etched into the decoder slabs thereby defining the outlines of a characteristic pattern with which the pattern in the field of view is to be compared. The etching of the characteristic pattern on a decoder slab includes laying out graphically the pattern on the slab and removing therefrom the unwanted diode areas by conventional printed circuit board techniques. The decoder slabs logically decode the binary output from the sensor diode slab. In contrast to conventional digital machines, programming is not necessary since it is accomplished graphically by the etching of the pattern outline on the decoder slab.

The document is moved past the sensor diode slab in the horizontal direction. Since the outputs from the sensor diode slab are connected to the decoder diode slab by vertical conductors, no output occurs until a horizontal alignment is present. The effective vertical alignment of the document is accomplished electrically through the scan and offset generator whose ganged scanning switch is displaced one row of diodes vertically for every revolution thereof. Each decoder slab pair provides an output when the vertical and horizontal alignments are within the tolerances therefor.

The photo diode slab pairs may be replaced by conventional matrices having diodes as discrete elements which are connected by conventional wiring. The slab matrix fabrication permits higher resolution and greater accuracy at a lower cost than a conventional diode matrix. The matrix of diodes is constructed with a smaller size than obtainable with wired discrete diode elements.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A pattern recognition system comprising, in combination:

a diode sensor matrix comprising rows and columns of photo-sensitive diodes interconnected so that each diode row may be selected sequentially to ascertain which diodes are conducting as a result of light shining thereon;

a first and second decoder diode matrix comprising rows of photo-sensitive diodes and connected to said sensor matrix, said first diode matrix having a plurality of said last-mentioned diodes disposed in an array resembling the light area of said pattern and said second decoder diode matrix having an array of said last-mentionedd iodes disposed in an array resembling the dark area of said pattern;

integration means jointly responsive to said first and second decoder diode matrices for indicating the presence on said sensor matrix of said pattern; and switching means connected to said sensor matrix and to said diode matrices for energizing each row of said sensor matrix and each row of said decoder diode matrices in a field sequential manner thereby comparing the light and dark areas of the pattern on said sensor matrix with the respective electrical equivalent diode patterns of the decoder matrices.

2. A pattern recognition system including:

sensing means having a geometric array of sensing elements, each said sensing element being a photo-sensitive diode;

means for conveying a field of view with said pattern therein to said sensing means as a representative light intensity distribution;

decoder means connected to said sensor means, said decoder means including a first and second decoding means, said first decoding means having a geometric array of unilateral conducting elements representative of the light area of said field of view, said second decoding means having a geometric array of unilateral conducting elements representative of the dark area of said field of view; and indicator means connected to said decoder means to provide an indication that said pattern has been conveyed to said sensing means.

3. A pattern recognition system including sensor means, said sensor means having a geometric array of sensing elements, said sensing elements being photo-sensitive diodes;

conveying means for conveying a field of view having said pattern therein to said sensor means as a representative energy pattern distribution, said conveying means including a geometric disposition of optical elements for projecting said field of view on said sensor means;

decoder means connected to said sensor means, said decoder means including a plurality of first and second decoding means for each said pattern to be recognized by said pattern recognition system;

indicator means connected to each said first and second decoder means to provide an indication that a particular pattern has been projected onto said sensor means, said indicator means including switching means connected to said sensor means and to said decoder means for surveying said sensor and said decoder means and thereby provide electrical pulses indicative of said particular pattern being sensed to said indicator means.

4. A pattern recognition system including:

sensor means, said sensor means having a rectangular matrix array of photo-sensitive diodes, said diodes being disposed in rows and columns and individual ones of said diodes having anodes and cathodes;

optical means for projecting an energy intensity distribution representative of the light area and dark area of a field of view having said pattern therein on to said photo-sensitive diode matrix, said optical means establishing said field of view in vertical registration on said sensor matrix, and said field of view passing across said sensor matrix in horizontal registration;

a plurality of vertical conductors for providing an electrical potential to said diodes, individual ones of said conductors in operable relationship with individual ones of said columns of said diodes and connected to said anodes of said diodes in said related columns, all said vertical conductors being commonly connected to a source of positive potential; a plurality of horizontal conductors, individual ones of said horizontal conductors being in operable relationship with individual rows of said diodes for connecting said rows to the terminals of a switching means;

a plurality of decoder matrices being representative of a particular pattern to be recognized, said pattern being described by said dark area in said field of view, said plurality of decoder matrices comprising at least a first and second decoder matrix, said first decoder matrix being a matrix of diodes forming a geometrical pattern commensurate with said dark area and having individual ones of said vertical conductors in operable relationship with said diodes, and said second decoder matrix being a matrix of diodes forming a geometrical pattern commensurate with said light area and having individual ones of said vertical conductors in operable relationship with said diodes; a plurality of horizontal conductors in operable relationship with said diodes;

switching means for comparing said sensor matrix with said decoder matrices in a field sequential manner, said horizontal conductors of said sensor and decoder matrices being connected to respective switches in said switching means;

indicator means including an RC network and a four-layer transistor for providing an indication of said pattern to be recognized when said RC network reaches a predetermined energy level as a result of said field sequential comparison.

5. A pattern recognition system comprising, in combination:

a sensing photo diode matrix and a plurality of pairs of decoding diode matrices, means for focusing light reflected from the patterns to be recognized on said sensing matrix, means for sequentially scanning the rows of said sensing matrix, means connecting the columns of said sensing matrix to the columns of each of said decoding matrices, the positions of the diodes in a first of each pair of decoding matrices corresponding to the light area of the pattern to be recognized by that pair, the positions of the diodes in the second of each pair of decoding matrices corresponding to the dark areas of the pattern to be recognized by that pair, the rows of each pair of decoding matrices being connected to an output device, an output device responsive to each said pair of decoding matrices, and means for sequentially scanning the rows of each pair of decoding matrices in synchronism with the scanning of said sensing matrix whereby the output device of a particular decoding pair will be energized upon the recognition of the pattern associated with that pair.

6. A system for recognizing an image comprising a pattern and a background including: means for projecting said image;

sensor means receptive of said projected image and responsive thereto;

a first decoder means communicating with said sensor means and having a disposition of diodes relating to the geometric nature of said pattern;

a second decoder means communicating with said sensor means having a disposition of diodes relating to the geometric nature of said background;

means for sequentially scanning said sensor means and said decoders thereby to compare selected portions thereof, said first decoder means discerning said pattern and said second decoder means discerning said background; and indication means connected to said first and second decoder means to provide an indication of the summation of the current outputs of said decoder means.

7. A system for recognizing an image comprising a pattern and a background including:

a sensor matrix means receptive of said pattern, said sensor matrix having a grid of photo-sensitive diodes connected respectively in a geometric array of rows and columns whereby light incident on said sensor matrix from said pattern causes unilateral connection between individual ones of said rows and columns selectively;

scanning means for said sensor matrix for connecting sequentially individual ones of said rows to ground; each said column of said sensor matrix being connected to a source of potential for establishing a path for current flow from said voltage source to ground when light is incident to one said diode;

first and second decoder matrices connected to said sensor matrix, said first decoder matrix having diodes disposed geometrically descriptive of said pattern and said second decoder matrix having diodes disposed geometrically descriptive of said background;

scanning means connected to said sensor matrix and said first and second decoder matrices for scanning them sequentially in a field sequential manner;

an integrator circuit connected between said decoder matrices whereby paths for current flow are established to said integrator for output currents from said first and second decoder matrices; and output means connected to said integrator network responsive to an electrical level characteristic of said pattern.

References Cited by the Examiner

UNITED STATES PATENTS

| | | | |
|---|---|---|---|
| 2,826,252 | 3/58 | Dickstein | 234—60 |
| 2,832,063 | 4/58 | McMillan | 340—174 |
| 3,069,079 | 12/62 | Steinbuch | 235—61.11 |

MALCOLM A. MORRISON, *Primary Examiner.*